Dec. 2, 1952     C. F. SHEPARD     2,619,872
OPTOMETRIC MEASURING DEVICE

Filed Feb. 11, 1949     2 SHEETS—SHEET 1

INVENTOR
CARL F. SHEPARD
BY *Alfred W. Petershoff*
ATTORNEY

Dec. 2, 1952  C. F. SHEPARD  2,619,872
OPTOMETRIC MEASURING DEVICE
Filed Feb. 11, 1949  2 SHEETS—SHEET 2
FIG. 4.
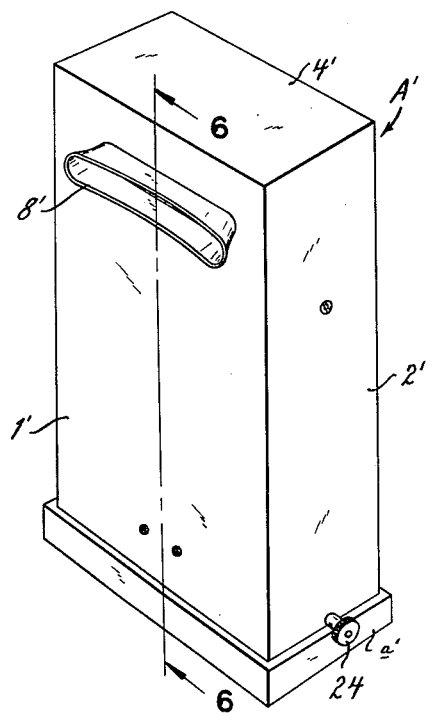
FIG. 5.
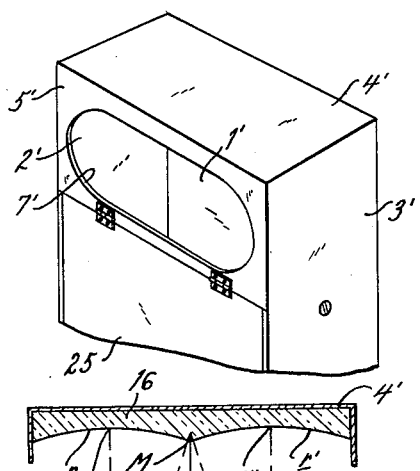
FIG. 8.
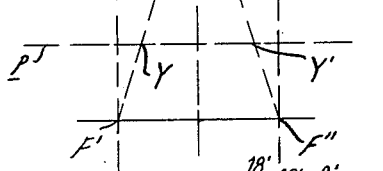
FIG. 6.
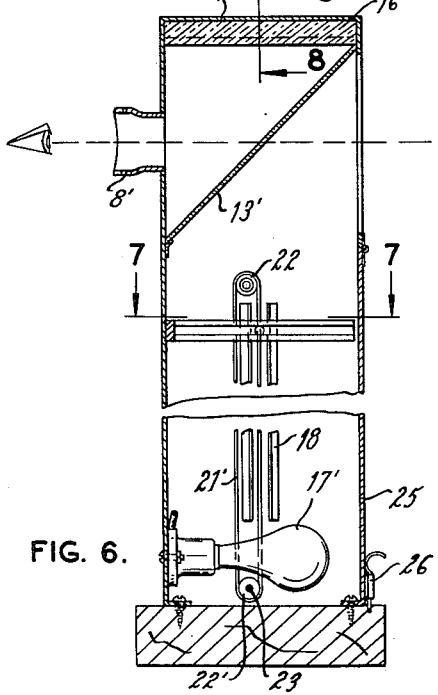
FIG. 7.
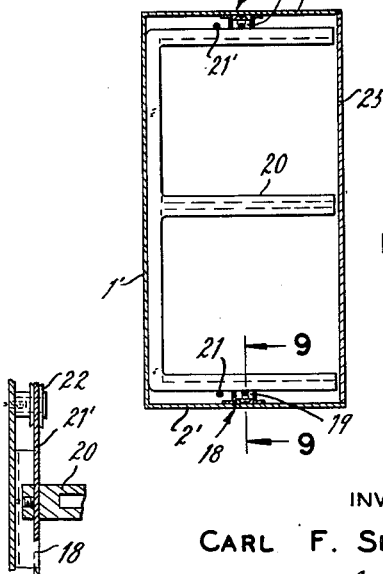
FIG. 9.
INVENTOR
CARL F. SHEPARD
BY *[signature]*
ATTORNEY Patented Dec. 2, 1952

2,619,872

UNITED STATES PATENT OFFICE 2,619,872

OPTOMETRIC MEASURING DEVICE

Carl F. Shepard, Chicago, Ill.

Application February 11, 1949, Serial No. 75,814

1 Claim. (Cl. 88—20)

This invention relates in general to certain new and useful improvements in optometric measuring devices and, more particularly, to a stereoscopic catoptric haploscopic optometer.

At the present time, it is quite common procedure in examining and measuring human eyes incident to prescribing spectacles to test the patient's vision against a testing chart which is mounted upon a wall or other suitable upright at some measured distance from the patient. The most familiar type of measuring chart consists of a series of vertically spaced lines of printed matter, the uppermost line being the largest in size and the successive lines therebelow being of successively smaller sizes in graded proportion.

It has been found, however, that the use of such charts in the traditional manner does not give precise and accurate results. An individual's vision and the eye's power of compensation seem to vary with the surroundings in which the powers of sight are exercised. For example, a sailor, whose eyes are accustomed for years to viewing objects over an empty expanse of water, or an urbanite whose eyes are habituated to viewing things along the crowded city streets, will not respond normally when tested by use of an eye chart suspended against a blank wall. True tests, it has been found, can only be obtained by testing sight against the customary or habituated background. Hence, theoretically, the city man's eyes should be tested on the city streets and amongst the tall buildings to which his eyes are habituated and the farmer's eyes should be tested in pastoral surroundings but the attainment of such actualities is, of course, generally impractical and unfeasible.

It is, hence, the primary object of the present invention to provide an optometric device by which a test chart may be superimposed or combined with any selected background scene so that a patient's eyes may be tested under conditions which, visually at least, simulate normal or familiar surroundings.

It is a further object of the present invention to provide an optometric device which is extremely compact, simple and economical in construction, and which, in small actual space, creates an optical effect corresponding to and selected visual distance for eye-testing purposes.

It is also an object of the present invention to provide an optometric device of the type stated which, in effect, creates any selected image in space at any desired distance from the eye by use of stereograms, and is uniquely of such construction as to permit convenient, quick change of the stereograms.

With the above and other objects in view, my invention resides in the novel features of form, construction, arrangement, and combination of parts presently described and pointed out in the claim.

In the accompanying drawings (two sheets),

Figures 4 and 5 are perspective views of the front and rear sides, respectively, of a modified form of optometric device constructed in accordance with and embodying the present invention;

Figure 6 is a vertical sectional view taken along line 6—6 of Figure 4;

Figure 1:
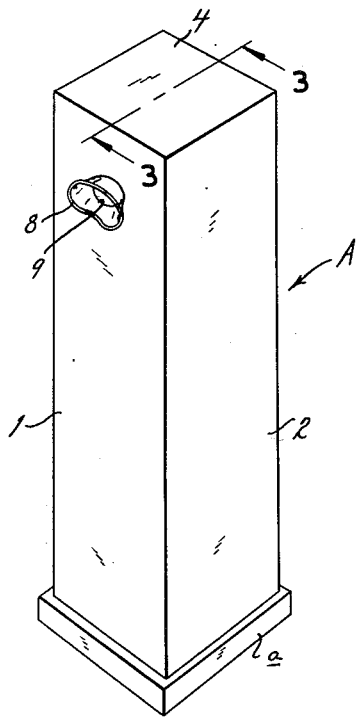
Figures 1 and 2 are perspective views of the front and rear sides, respectively, of an optometric device constructed in accordance with the present invention.
Figure 2:
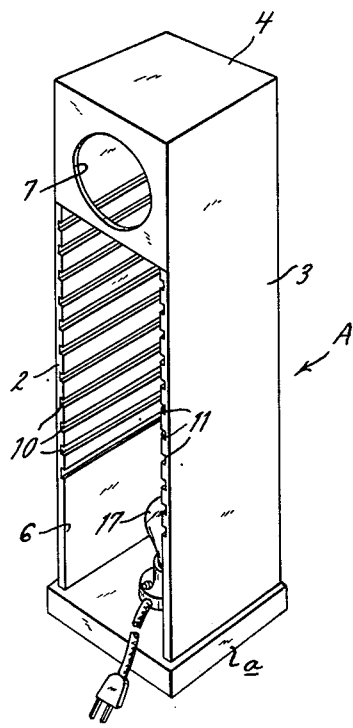

Figures 7 and 8 are fragmentary sectional views taken along lines 7—7 and 8—8, respectively, of Figure 6; and Figure 9 is a fragmentary sectional view taken along line 9—9 of Figure 7.

The present invention, broadly speaking, resides in the provision of a housing or framework having an eyepiece or sight-hole and an angularly disposed transparent mirror or partial mirror interposed across the line of sight through the eyepiece. Disposed on opposite sides of the mirror along a line angularly disposed to the line of sight by an angle equal to the angle of incidence of said line of sight with respect to the mirror, are a concave reflector and a stereogram, the latter preferably being mounted in an adjustable slide to permit variation of the distance between the mirror and the stereogram.

Referring now in more detail and by reference characters to the drawings which illustrate practical embodiments of the present invention, A designates an optometric measuring device comprising a base $a$ provided with an upstanding front wall 1, side walls 2, 3, and top wall 4, defining a substantially three sided housing, preferably having a partial back wall 5 extending downwardly from the top wall 4 for a short distance and leaving the remaining space open in the provision of an access aperture 6. The back wall 5 is also provided with a relatively large line-of-sight aperture 7 and the front wall 1 is similarly provided with an eye-piece 8 which extends therethrough with its aperture 9 horizontally co-incident with the center of the aperture 7 to establish a line-of-sight SI.

Figure 3:
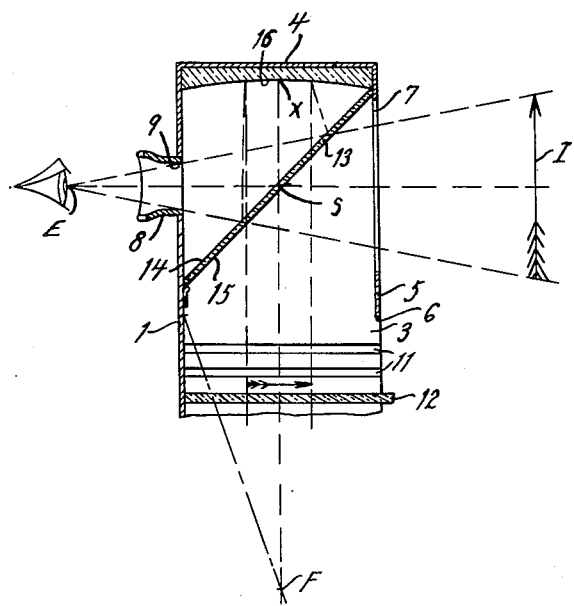
Figure 3 is a fragmentary sectional view taken along line 3—3 of Figure 1.

The side walls 2, 3, are respectively provided upon their inner faces with uniformly spaced series of horizontal slots, 10, 11, each one of the slots 10 being in juxtaposition to a corresponding one of the slots 11 in the provision of a pair of ways for receiving and supporting a transparent stereogram slide 12 provided by photographic or any other suitable process with a suitable image which, for illustration purposes herein, has been schematically shown as an object-arrow O in Figure 3.

Rigidly mounted between the side walls 2, 3, and extending thereacross at an angle of 45° from a line below the eye-piece 8 on the front wall 1 to a line equidistantly above the line-of-sight on the back wall 5, is a transparent plane-surfaced glass sheet 13 the upper face 14 of which is highly polished to function as an efficient reflector and the lower face 15 of which is preferably provided with a low-reflective coating to prevent double images. Similarly mounted upon and extending horizontally across the under face of the top wall 4 is a downwardly presented concave reflector 16 having a vertical optical axis XF preferably coincident with the vertical center-line of the device A and intersecting the glass-sheet 13 at the same point of intersection S as the line-of-sight SI. Conventionally mounted on the upper face of the base $a$ is an electric light source 17.

In use when examining a patient's eyes against a conventional eye chart (not shown) the device A is placed in front of the eye chart so that the patient's line-of-sight SI will pass through the eye-piece aperture 8 and the back wall aperture 7 and thence toward the chart so that the patient can see the chart as a real object along his direct line-of-sight SI. A stereogram 12 having for example a city scene, if the patient is a city dweller, is placed in a selected pair of slots 10, 11, at such distance from the point S so that the scene (schematically shown by the object arrow O) will appear to be projected into space (as schematically shown by the image arrow I) in a plane approximately coincident with the test chart I so that the test chart will appear to be framed, so to speak, in surroundings which conform to the patient's normal visual experience.

The point F (Figure 3) represents the location of the principal focal point of the reflector 16, on the optic axis XF and the point E represents the point of vision or eye of that patient. The line IE, as previously stated, passes through the point S is at right angles to the optic axis XF of the reflector 16. The distances SF and SE are equal. Light approaching the reflector 16 from the direction of F passes through the sheet 13 where some of it is reflected toward E; reaching the eye as if it emanated from some point in the direction of I. The rest of the light passes through the glass sheet 13, back toward its original source, or surface in the direction F from which it emanated.

The laws of optics provide that the distance from the point E of the image seen by the observer along the line IE is to its distance from E as the corresponding dimension on the slide 12 is to the focal length XF, no matter where the slide 12 is placed relative to F. The laws of physiologic optics provide that the image formed within the eye of the slide 12, when such image is well focused within the eye, remains of constant dimensions, regardless of the variations of the distance between the slide 12 and F required to produce such a well focused image within the eye.

The conventional position for an ophthalmic lens, worn to correct the focus of images within the eye, is at the anterior principal focus of the eye. The conventional method of denoting the power of such a lens is in terms of a unit called the diopter. The dioptric power of a lens is the reciprocal of its focal length in meters. Such lenses are prescribed to neutralize or compensate for whatever discrepancy exists in the physiologic ability to adequately focus images within the eye. Consequently, when the attention of the observer whose eye is at E, directed toward a test chart at any distance along the line EI, and a suitable slide 12 is moved along the line XF until the image (I) of the slide 12 is apparent to the observer to be satisfactorily focused upon the screen, the position of the screen, as compared to the reciprocal of the actual distance (in meters) of the test chart from the point E, permits instant determination of the lens requirement to compensate for discrepancies of the observer's ability to adequately focus for objects in the location of the screen.

It is also possible to provide a slide 12 having inscribed thereon a ladder of fine lines, so that it slopes obliquely from a point just below the lower edge of the glass sheet 13 to some point equidistantly below the point F, illustrated by the dot-dash line in Figure 3. This "ladder" may be rotated manually or otherwise so that its image appears to the observer as a band of light in any desired meridian comparable to a position of the hand on the dial of a clock. The lines are distinctly visible only when ($a$) their directions correspond to the principal meridians of the eye (when the observing eye is astigmatic) and ($b$) only where they cross the level corresponding to the position of the slide 12 in the preceding description of determining the needed ophthalmic lens. Thus, this device provides means for the determination of needed visual aids almost by direct readings and in much less time than by any prior methods.

It is also possible to provide a modified form of optometric device A' as shown in Figures 4 to 9, inclusive. The device A' is similar to the previously described device A, comprising a base $a'$, a front wall 1', side walls 2', 3', top wall 4', and back wall 5', a light source 17', a transparent glass sheet 13' except that the entire device is made wide enough to accommodate a double-width eye-piece 8' and line-of-sight aperture 7' so that the patient may use both eyes at once. Correspondingly, a double concave reflector 16' is mounted upon the under face of the top wall 4' and is ground to provide single concave reflectors $r$, $r'$, for each eye having foci F', F'', and a center point M (Figure 8).

Mounted upon and extending centrally upwardly along, the inner faces of the side walls 2', 3', are juxtaposed slide-ways 18, 18', for receiving slide blocks 19, 19', operably mounted on a horizontal double-frame slide carrier 20, which is in turn operatively secured to flexible endless belts 21, 21' trained over pairs of pulleys 22, 22', as best seen in Figure 6. One of the lower pulleys 22' is primed upon a short jack-shaft 23 bearinged in, and extending through, the side wall 3', being provided upon its outer end with a knurled knot 24 to facilitate manipulation whereby the slide carrier 20 may be shifted vertically to any desired position between its upper and lower limits.

Finally, the back wall 5' is provided along its lower horizontal margin with a hinged door 25 which serves as a complete closure for the lower portion of the back wall and is releasably held in place by a conventional finger latch 26. The door 25 thus prevents access of unauthorized light and at the same time permits access to change the stereograms which may be placed in the slide holder 20.

The lines MF' and MF'' illustrate the limits of the exclusive field of view for each eye. The images of two lines or cords occupying the positions of these two lines would appear, through the reflection or catoptric system, as a single rope or bar extending from a point near the point S' straight out to infinity along a line median to the two eyes.

A stereogram placed at one of the levels such as $p$ with points Y and Y' being stereoscopically similar, (such as photographic reproductions of the same object taken by two cameras 1.3 meter from the object, and at a distance from each other equal to the distance F' F'') produce, through the catoptric system, for the observer, precisely the same visual sensations he would have experienced had his eyes occupied the position of the lenses of the photographing cameras.

The optometric measuring devices A, A', both may also be used to secure facial measurements for use in making spectacles by inscribing a slide 12 with a grid of crossed and parallel lines of measured spacing to a predetermined scale and placing the grid in the plane of the focal point F or F', F'', as the case may be. The optometrist may then look through the aperture 7, or 7', as the case may be, toward the patient and the grid will appear to be projected across the patient's face in the plane later to be occupied by the spectacles so that measurements read from the grid will provide an accurate specification for the mechanical details of the spectacles.

An unlimited variety of stereograms may be made, and many such are being prepared, so that tests by visual acuity, and other visual abilities, may be made while the observer undergoes visual experiences which are in every way similar to those which accompany the demand for the visual ability being tested. That is: the auto driver will see his test-chart as if in the center of a highway when his vision is tested for auto driving, the ships officer will see his test-chart surrounded by an expanse of water, and so forth.

It should be understood that changes and modifications in the form, construction, arrangement, and combination of the several parts of optometric measuring devices may be made and substituted for those herein shown and described without departing from the nature and principle of my invention.

Having thus described my invention, what I claim and desire to secure by Letters Patent is:

An optometric device comprising a box-like housing having front and side walls, said box-like housing having a rear wall provided with an unobstructed window opening therein an eye-piece mounted in and extending through the front wall in horizontal alignment with said window, said eye-piece being apertured for defining a horizontal line of sight extending from the eye-piece rearwardly through the window, a transparent sheet of glass interposed obliquely across said line of sight and inclined away from said eye-piece, and a concave mirror mounted horizontally between said walls above the sheet of glass, said walls being provided with a series of spaced pairs of slots located below the sheet of glass and being adapted to support a stereogram in various selected positions of adjustment toward and away from the sheet of glass.

CARL F. SHEPARD.

REFERENCES CITED

The following references are of record in the file of this patent:

UNITED STATES PATENTS

| Number | Name | Date |
| --- | --- | --- |
| 1,693,527 | Reeves | Nov. 27, 1928 |
| 1,821,626 | Fleischer | Sept. 1, 1931 |
| 1,946,925 | Ames | Feb. 13, 1934 |
| 2,063,015 | Ames | Dec. 18, 1936 |
| 2,313,204 | Morelle | Mar. 9, 1943 |
| 2,349,457 | Osterberg et al. | May 23, 1944 |
| 2,358,316 | Chwalow | Sept. 19, 1944 |
| 2,363,643 | Cook | Nov. 28, 1944 |
| 2,441,160 | Martin | May 11, 1948 |
| 2,475,366 | Wood et al. | July 5, 1949 |

FOREIGN PATENTS

| Number | Country | Date |
| --- | --- | --- |
| 15,708 | Great Britain | Nov. 6, 1915 |
| 614,929 | Great Britain | Dec. 30, 1948 |